United States Patent [19]

Anderson

[11] 4,398,227
[45] Aug. 9, 1983

[54] MAGNETIC TAPE DRIVE WITH ADAPTIVE SERVO

[75] Inventor: Robert Anderson, Boulder, Colo.

[73] Assignee: Storage Technology Corporation, Louisville, Colo.

[21] Appl. No.: 244,064

[22] Filed: Mar. 16, 1981

[51] Int. Cl.³ .............................................. G11B 15/18
[52] U.S. Cl. ..................................... 360/71; 360/72.1; 360/73; 360/74.2; 242/188; 318/7
[58] Field of Search ....................... 360/69, 50, 71, 73, 360/72.1–72.3, 74.2–74.3; 242/182, 184, 186, 188, 193; 318/6, 7

[56] References Cited

U.S. PATENT DOCUMENTS

| | | | |
|---|---|---|---|
| 3,809,335 | 5/1974 | Mantey | 242/186 |
| 3,910,527 | 10/1975 | Bohler et al. | 242/186 |
| 3,982,160 | 9/1976 | Goldschmidt et al. | 318/7 |
| 4,156,257 | 5/1979 | Roberts | 360/71 |
| 4,232,371 | 11/1980 | Kamoto | 242/186 |

Primary Examiner—John H. Wolff
Attorney, Agent, or Firm—Woodcock, Washburn, Kurtz, Mackiewicz & Norris

[57] ABSTRACT

An improved drive for a magnetic data storage tape is described which features direct coupling of the tape from a machine to a file reel without interposition of vacuum buffers or spring loaded tension control devices. Control of the current supplied to motors driving the file and machine reels is performed by a microprocessor in response to information derived during an initialization routine performed at first mounting of a reel of tape upon the drive and in response to continuously generated velocity information generated by tachometers on the motor shaft. The absolute position of the tape can at all times be known to the microprocessor and the tension of the tape can be controlled by control of the supply of current to the motors. In a preferred embodiment, a solid state buffer memory is provided to accept data from a host computer during the time the tape drive comes up to speed. By use of the initialization routine to determine motor losses, windage, brush and bearing wear, and the moment of inertia of the motor/reel systems, and the instantaneous tachometer data, direct sensing of tape tension can be avoided, thus eliminating mechanical parts in favor of sophisticated electronic control means.

3 Claims, 4 Drawing Figures

MAGNETIC TAPE DRIVE WITH ADAPTIVE SERVO

FIELD OF THE INVENTION

This invention relates to the field of drive units for magnetic data storage tapes. More particularly, this invention relates to a magnetic tape drive unit in which conventional drive arrangements are replaced by an adaptive servo drive for the unit and in which vacuum buffers are supplanted by solid state data buffering.

BACKGROUND OF THE INVENTION

Throughout the development of the computer industry, there has been an ongoing need in the art for fast and inexpensive storage means for large quantities of digital data. One of the least expensive means for storage of such data is on magnetic tape. However, a difficulty with magnetic tape is that it must be stored on reels and that, therefore, a portion of a tape to be accessed must first be unwound from the reel on which it is stored, thus limiting access. However, even given that the particular application in which magnetic tape is to be used does not require fast access it may and frequently does involve frequent stops and starts of the tape drive within a given file when, for example, a host computer requests the reading or writing of a record from the tape. Accordingly, it has been an aim of the art to provide a magnetic tape drive which can stop and start the tape within a very short period of time. Those skilled in the art will recognize that rapid stopping and starting of any mechanical system requires overcoming of inertial loads imposed by the movement of the masses to be stopped and started, i.e., the reels of tape themselves as well as associated motors and possibly other hardware. The most common prior art practice for overcoming the considerable inertial loads imposed by rather massive reels of tape, has been to "decouple" the portion of the tape in the vicinity of the read/write head from the bulk of the tape carried on the reels by providing plural vacuum columns or "buffers" or swing arms disposed between the reels and on either side of the read/write head whereby the only portion of the tape which must be accelerated quickly is that small fraction in the immediate vicinity of the read/write head. A quantity of tape could be inserted into or drawn out of a vacuum buffer or a loop taken up on the swing arm while the reels themselves came up to speed.

Concomitant with the use of vacuum buffers to decouple the bulk of the mass of the tape from that portion of the tape in the vicinity of the read/write head came development of elaborate control circuitry for varying the speeds of the two motors typically used to drive the tape supply and takeup reels (or, more conventionally, the "file" and "machine" reels). It will be appreciated, of course, that as tape is unwound from one reel onto the other their relative rotational speeds must vary if the linear speed of the tape past the read/write head is to remain constant, as is required by all presently used data coding systems. Numerous prior art patents show such vacuum buffers on either side of the read/write head and additionally show circuitry used to control the relative speeds of the two reels. See, e.g., U.S. Pat. Nos. 3,713,606 to Van Pelt et al; 3,984,065 to Boseti et al; and 3,648,134 to Audeh et al.

As mentioned above, all presently used tape data coding schemes involve constant speed of the tape past the read/write head. Typical prior art methods involve use of a comparatively heavy capstan in contact with the tape so as to provide a "flywheel effect" to its motion whereby transients in the speed of the tape are damped out by the mass of the flywheel capstan. Usually the capstan is moved into contact with the tape when it is desired that the tape move. In this way the capstan itself need not be stopped or started at either end of a read or write operation.

Later practice, as shown by the Van Pelt et al patent is to use a low-inertia, high performance capstan started and stopped with the tape. Clearly this causes restraints on the capstan design; typically a vacuum capstan is used to ensure good contact betwen tape and capstan.

More recently it has been realized as desirable that the vacuum buffers be eliminated so as to simplify the mechanical construction of the tape drive and to make it smaller in overall size. To this end more elaborate control schemes have been devised which allow the machine and file reels to be individually powered by servo motors and the tape to be directly connected therebetween. In order that the write operation not be delayed by the length of time required for the tape to come up to speed, a write command having been given, a solid state buffer memory can be provided to contain the data written during this period of time. Such a memory would amount typically to a sequential memory, data being fed in at one end by the host computer and written out of the other end onto the tape, the length of time required for data to pass from one end of the memory to the other being equal to or greater than that required to bring the tape up to speed.

It will be appreciated that in the prior art vacuum buffered tape drives, sensors could be provided within each of the vacuum columns to sense the precise position of the tape loop within the column so as to provide an exact indication of the relative speeds of the two reels and which could be used to provide a signal to correct the speed of the reels. In the more modern unbuffered (or direct coupled) tape drives, since there are no vacuum buffers, either the servo drives of the two reels must be very accurately controlled to keep the tension on the tape sufficiently low that it does not break, or other tension control means, such as a resiliently loaded arm with a idler reel mounted thereon, must be provided. Myriads of prior art references have addressed the problem of the precise control of the servo motors powering the two reels but none have achieved complete success. This lack of success is due to a variety of factors which complicate the design of such circuitry. For example, the variables which must be taken into account in such a system include the thickness of the tape, brush and bearing wear in each of the servo motors, windage (i.e. wind resistance) on the reels, which spin at comparatively high speeds, thermal variation in the speed of the motors as the tape drive is operated over a long period of time, drift of the analog circuit elements typically used in the servo loop circuits used to drive the reels, manufacturing tolerances and the like.

Numerous prior art expedients have been proposed in attempts to solve these problems. For example, U.S. Pat. No. 3,746,286 to Dennis et al shows provision of an arm over which the tape is passed in its passage between the two reels. The arm rotates on the shaft of a potentiometer, the resistance of which is, therefore, indicative of the tension on the tape. However, this apparatus involves undesirable mechanical complexity and inertia in the movement of the arm and furthermore, is insensitive to the thickness of the tape as well as the dimensional variations from one reel hub to the next.

The same objection applies to the scheme shown in U.S. Pat. No. 3,764,087 to Pannanen et al which shows a tachometer mounted on the shaft of one of the reels which can be used to generate a signal which in turn can be used to control the speed of that reel at a constant rate. It turns out that tape thickness can vary by as much as 10% and this can result in an error of as much as 6% in the speed of the tape when the Pannanen et al approach is used. An improvement on the Pannanen et al approach is disclosed in U.S. Pat. No. 3,984,868 to Ragle et al in which the gaps remaining between blocks of data recorded on a tape are measured to provide indication of the speed of the tape. Clearly the accuracy of the speed signal derived from the length of these gaps is limited by the accuracy to which their recordation can be controlled.

Still other prior art approaches involve the measurement of the tension on the tape, such as is shown in U.S. Pat. No. 3,910,527 to Buhler et al, or the physical measurement of the radius of the tape stored on a reel at any given time such as is proposed in U.S. Pat. No. 4,015,799 to Koski et al. These involve the clear drawbacks that mechanical sensors which are inevitably subject to physical variations as well as temperature drift must be provided.

One of the more promising prior art approaches is shown in U.S. Pat. No. 4,125,881 to Eige et al. This patent discloses using tachometers on each of the two reel shafts, one providing one pulse per revolution and one providing a plurality of pulses per revolution. The signals output thereby can be used to derive signals the relative accuracy of which is not affected by such matters as temperature drift, windage, motor brush and bearing wear and the like. However, the Eige et al disclosure still requires that a complex and expensive mechanical tension sensor be provided. This is used to control amplifiers in the servo loops and hence is essential to the Eige et al motion control scheme. Finally, the Eige et al scheme provides only a relative indication of the position of the tape, not an absolute position sensing apparatus. Accordingly, if for some reason both motors should vary together the Eige et al control scheme would not be able to detect this. Clearly it would be preferable to have an absolute position indication available at all times which would greatly simplify the control of the motion of the tape.

Accordingly, the need remains in the art for an improved tape drive which does not require mechanical sensors of stored tape radius, tape tension or the like and which does not involve mechanical tape buffer schemes, while providing increased performance in a physically diminutive package.

OBJECT OF THE INVENTION

It is an object of the invention to provide an improved drive for magnetic data storage tape.

A further object of the invention is to provide an improved magnetic tape drive which does not require vacuum buffers for decoupling of the great mass of tape from that in the vicinity of the read/write head.

A further object of the invention is to provide a tape drive system which provides a directly coupled connection between the machine and file reels but which does not require mechanical sensing of tape position or tension.

Still a further object of the invention is to provide a magnetic tape drive which offers superior performance over those available in the prior art, while being more compact and mechanically simplified.

SUMMARY OF THE INVENTION

The above objects of the invention and needs of the art are fulfilled by the present invention which comprises a magnetic tape drive in which servo motors driving the machine and file reels are individually controlled by a micro-processor. The micro-processor receives inputs from tachometers mounted on the motor shafts and controls power amplifiers supplying the power to the servo motors for the driving of the reels.

An initialization routine is performed each time a reel of tape is mounted upon the drive for use. At this time a predetermined amount of power is supplied to the servo motors, and the resultant output of the tachometers is used to calculate the values of the variables mentioned above; i.e., windage, the brush and bearing wear undergone by the motor, the motor constants, the diameter of the reel of tape and so forth. In a preferred embodiment these values are used to calculate desired values for motor power to be applied to the servo motors later to make corrections in the speed. These calculated values are then stored in look-up tables for ready reference by the micro-processor later as required. Use of these initial conditions together with the information provided by the tachometers during operation of tape drive of the invention allows other variables, such as the thickness of the tape, to be calculated during operation and used for fine control, while permitting the microprocessor to "know" the absolute position of the tape at any given time.

The initialization routine thus determines the torque constant of the reel motors, i.e., the amount of torque output by each servo motor in response to a given input current, the frictional drag of brushes and bearings, the windage, or wind resistance imposed by the reels and other rotating mechanisms, and also permits the calibration of the servo electronics. In this way the servo system can automatically compensate for manufacturing tolerances in the various parts, thermal changes in the motors, and brush and bearing wear undergone by the motors over time. Furthermore, the use of the initialization routine ensures drive integrity, that is, that the tape is properly wrapped around the machine reel, and that the drive is ready to proceed with operations. Moreover, in a presently preferred embodiment, neither mechanical tension control nor sensing is required thus greatly simplifying the construction of the drive. Finally, in a presently preferred embodiment, the initialization routine as described above requires only ½ second. In view of the fact that it takes substantially longer time to mount a reel of tape on the tape drive, including the opening of the cartridge within which tapes are typically supplied, and to go through steps designed to ensure that the tape is properly fixed to the machine reel, this initialization test time requirement is insignificant. Therefore, the tape drive of the invention satisfies the objects of the invention and needs of the art mentioned above without performance penalty.

BRIEF DESCRIPTION OF THE DRAWINGS

The invention will be better understood if reference is made to the accompanying drawings in which.

DESCRIPTION OF THE PREFERRED EMBODIMENTS

Figure 1:
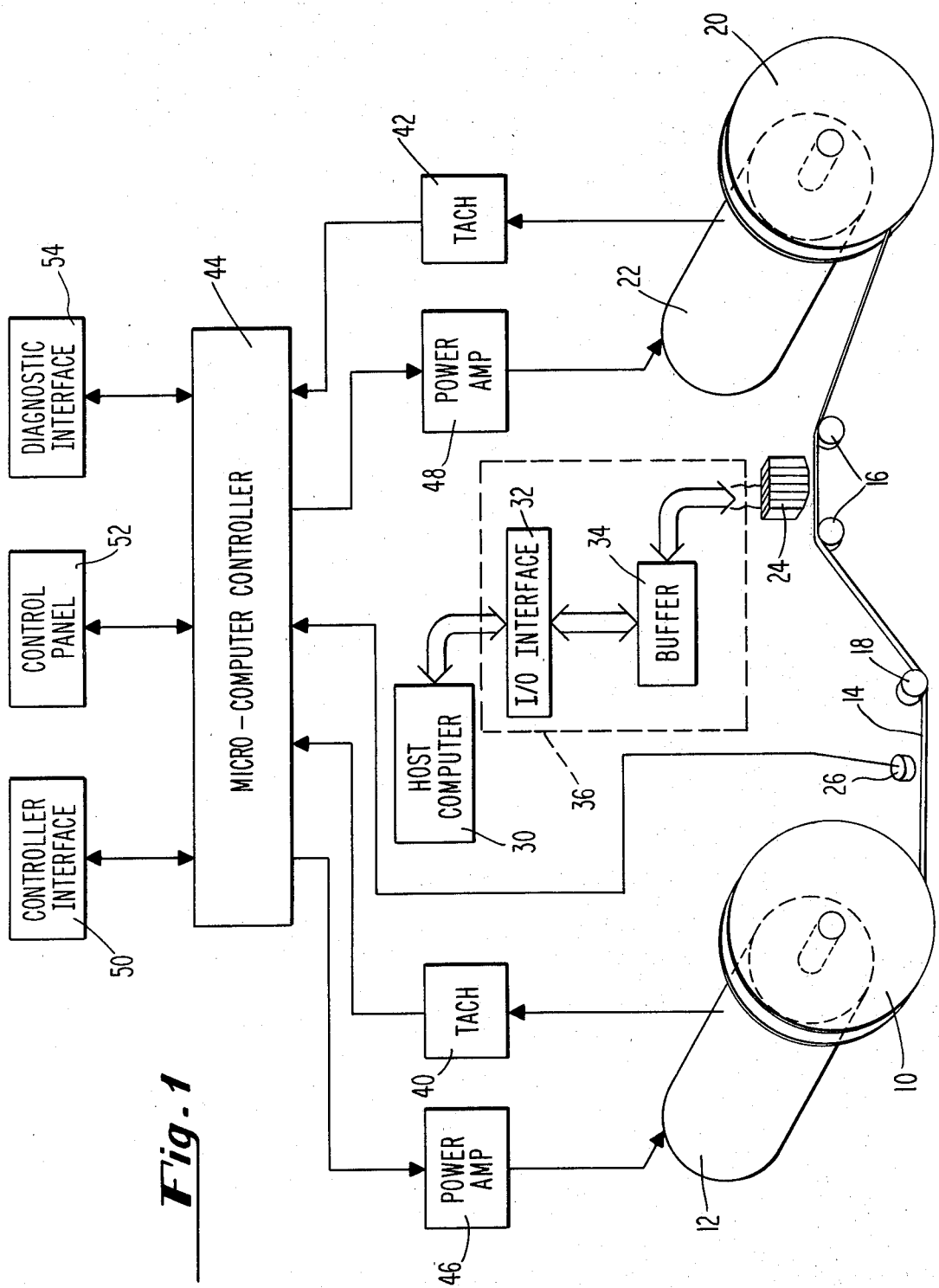
FIG. 1 represents an overall block diagram view of the tape drive according to the invention and shows the tape reels mounted on dual servo motors and a web of tape passing therebetween.

As discussed above, earlier magnetic tape drives operated on the principle that maximum performance could be obtained by minimizing the inertial effects of the mass of tape which had to be quickly started or stopped in response to commands from a host computer. In order to do so, the great mass of tape carried on the drive was decoupled from that part which had to be substantially instantaneously accelerated by the use of vacuum buffer columns on either side of the read/write head. The mechanical complication and space requirements of such arrangements are undesirable, however, and it has been for some time the aim of the art to eliminate these vacuum columns from tape drives. Accordingly, solid state data storage buffers which have substantially instantaneous access capabilities have been used to replace the vacuum buffer columns; this permits the tape drive to accelerate up to speed over some longer length of time. In order that the speed of the tape past the read/write head can be substantially constant, it is essential to control the speed of the motors driving the supply and take up (hereinafter sometimes "file" and "machine" reels, respectively) by servo motors so that a constant comparatively light tension is maintained on the tape. Numerous prior art approaches to maintaining this tension uniformly, that is, maintaining the proper relative speeds of the two motors, have been tried. These have in general involved direct sensing and control of the tension in the tape and have additionally sometimes included measurement of the rotational speed of the motor shafts. According to the present invention, there is no compliance in the tape path at all; it is effectively directly or "hard" coupled. There are no tension sensors, spring loaded rollers or the like. The hardcoupled nature of the two reels means that they provide a flywheel effect to the speed of the tape past the read/write head, i.e., that its speed is maintained substantially constant by the rotational inertia of the two reels. In a second preferred embodiment, a buffer is disposed between the host and the read/write head having a storage capacity equal to the data transfer rate times the time taken for the tape to come up to speed so that in the event a host computer desires to write data to the tape the buffer can hold the data being written until the tape is up to speed, at which time the first data bits input to the buffer are begun to be written onto the tape. The use of the buffer means that the access time required for the tape to be prepared for writing is essentially zero, thus eliminating one of the traditional disadvantages of tape drives. Moreover, the use of buffering allows smaller interblock gaps (i.e. gaps between adjacent blocks of data) since it is no longer necessary (as in the prior art) to start or stop the tape in the gap. Instead acceleration and deceleration of the tape is performed while a longer length of tape passes the read/write heads; once having stopped, the tape is then rewound to a position from which it can be accelerated up to speed at the end of the gap between the last block of data read or written and the next. In this way the density of data written onto the tape can be increased in some cases as much as threefold. The mechanical and control portions of the drive of the invention are also useful without the solid state buffers.

Reference to FIG. 1 will make certain aspects of the invention more readily comprehensible. The system of the invention comprises a supply or file reel 10 mounted upon a first servo motor 12 supplying a web of magnetic tape 14 threaded, by means of tape guides 16 and a tape cleaner 18, which may be in accordance with the teachings of the prior art, onto a takeup or machine reel 20 mounted for rotation upon the shaft of a second servo motor 22. A read/write head 24 is desirably interposed between the guides 16. A tape presence sensor 26 may be provided as may detectors of "End Tape" and "Beginning of Tape" markers. Data is passed from a host computer 30 via an input/output interface 32 and the data buffer 34 mentioned above, which may comprise an ordinary RAM unit of known type, to the read/write head 24. In some embodiments of the invention the input/output interface and buffer may be such as to be capable of controlling and supplying a plurality of tape drive units according to the invention, in which case they would typically be enclosed in a formatter/controller unit indicated generally at 36 which might control up to eight tape drives according to the invention. Other conventional elements, such as preamplifiers, analog to digital converters, formatting control apparatus, and the like, are also incorporated in the formatter/controller 36.

Each of the servo motors 12 and 22 are arranged to provide a tachometric signal of their rotational speed. For example, they may comprise simple disks of clear glass or plastic scribed with dark radial lines at regular intervals interposed between photo detectors and light sources so that the photo detectors output a series of regular pulses. By comparing the frequency of the pulses output by the two tachometers indicated at 40 and 42, a signal may be derived indicative of the relative speeds of the two motors and hence, of the relative diameters of the tape "packs" stored on the reels 10 and 20, since, as discussed above, there is no compliance in the path of the tape 14 connecting the reels 10 and 20. In a particularly preferred embodiment of the invention, the signals output by the tachometers 40 and 42 are passed through a microcomputer controller 44, in a preferred embodiment built around a microprocessor unit, which calculates the power required to operate the servo motors in accordance with the requirements of the system and accordingly outputs signals to power amplifiers 46 and 48 for the control of the servo motors 12 and 22. Inputs to the microcomputer 44 include the controller interface 50, which will ordinarily be a part of the formatter/controller unit 36, if such is used, and a tape drive control panel indicated generally at 52. A diagnostic interface 54 may also be provided to ease trouble shooting of the system, all in well-known manner.

It will be appreciated by those skilled in the art that in order to keep a proper tension on the tape at all times it is essential that the torques exerted by the motor be carefully controlled by controlling the current supply thereto.

The basic motion equation applicable to each reel is $$d^2\Theta/dt^2 = T/J \qquad (1)$$

where
$d^2\Theta/dt^2$ = angular acceleration of the reel;
T = total torque exerted = $T_{motor} + T_{tension} + T_{loss}$; and
J = the moment of inertia of one motor, hub, and tape reels.
The torque exerted by the motor, $T_{motor}$, is defined by $$t_{motor} = I \cdot K_t \qquad (2)$$

wherein
I = motor current; and
$K_t$ = motor constant.
Accordingly the current I required to achieve a desired acceleration $d^2\Theta/dt^2$ is defined by $$I = \frac{d^2\theta}{dt^2} \frac{J}{K_t} - \frac{T_{tension}}{K_t} - \frac{T_{loss}}{K_t} \qquad (3)$$

From equation (3) it is clear that before the microprocessor 44 can supply the proper signals to the power amplifiers 44 and 48 to cause the appropriate current to be directed to the motors 12 and 22, $T_{tension}$ and $T_{loss}$ must be known. Moreover, as the term J, indicative of the moment of inertia of the system, varies as the tape is transferred from one reel to the other and differs depending on the inertia of the file reel on which the tape is supplied, it too must be known. Moreover, it will be understood that $K_t$, the motor constant, varies from motor to motor and may vary over time both long term as the motor's brushes and bearings wear over the comparatively shorter term due to thermal drift and the like.

Therefore, while it will be appreciated that even to maintain, e.g., a steady tension on the tape while the moment of inertia of both reels changes due to the tape being unwound from one and wound onto the other would be a task of significant difficulty, it is far more complicated to smoothly accelerate the tape up to a given desired speed or decelerate it to a stop without very specific knowledge of the individual variables mentioned above. Nor would it be sufficient to simply apply a given current to the motor to accelerate it, since as the inertial loads imposed on the motor vary with the amount of tape on the reels, the acceleration will not always be constant. That is, the acceleration undergone by the two reels will vary with respect to the amount of tape on each; accordingly, the current to be supplied even for a maximum, ungoverned, acceleration would vary with time.

The present invention, in addition to satisfying the objects of the invention and needs of the art listed above, solves these problems by providing the microprocessor with sufficient "knowledge" that values for the above variables can be calculated at any time during the operation of the tape drive according to the invention. The particular approach chosen is to perform an "initialization" routine whenever a new cartridge or reel of tape is mounted on motor 12. Thereafter the microprocessor operates as an adaptive servo using tachometers provided on the shaft of the file reel motor 12 and machine reel motor 22 respectively to calculate the current to be supplied to the motors in order to achieve any desired result, whether it be operation at a steady tape speed, deceleration or acceleration. After initialization, the current required to be supplied to the motors to result in a given change of stage in the speed at any future position of the tape is calculated; during running, periodic updates can be performed on some of the variables. Thereafter, when a change of state is desired, the previous calculations are consulted and the proper current is supplied. By performing initialization upon mounting of each new reel of tape on the file reel motor shaft, the variables concerning this reel of tape as well as any variations in the motor characteristics over time are automatically taken into account. Moreover, since the machine reel is not replaced, its radius prior to threading of tape remains constant; since this quantity is "known" by the microprocessor, comparison of the relative rotational speeds of the two reels thereafter can be used by the microprocessor to yield a signal indicative of the absolute position of the tape with respect to the read/write head.

It will be appreciated therefore that the use of the initialization routine provides a number of advantages to the system of the invention. In particular, it not only compensates for all variation in the production of parts, reel size, overall type length and thickness and so forth, but additionally can be used to provide a signal indicative of the drive's proper function. Furthermore, the use of the results of the initialization routine to perform calculations based thereon and store the results in "look up" tables which can be accessed later by the microprocessor, means that all analog circuitry is initialized at once and any errors in the brushes, friction of the motors, and current variations are compensated for automatically.

It will be appreciated by those skilled in the art that the elimination of the tape loops in vacuum buffer columns or around swing arms of the prior art tape drives in favor of the direct coupled approach allows the reels of tape themselves to serve as comparatively heavy flywheels in the tape motion equation. That is, direct coupling assists in allowing precise prediction of the torque required to rotate the motors at any desired speed, which is what permits the initialization routine to be used and to provide a sufficiently accurate prediction of the current required to be supplied to the motors. This in turn allows extreme simplification of the mechanical apparati of the invention by comparison to the prior art in favor of the less expensive and generally more reliable microprocessor.

As discussed above, the approach taken by the present invention to the problem of control of the reels connected by the web of the tape is that of an adaptive servo. Such a servo is not only adaptive with respect to specific file reels and weights of tape but also to long term variations in, for example, the torque constant of the motor, that is the torque output by the motor in response to application of a given current, which may vary by as much as ±10% from motor to motor or within the same motor over time. Accordingly, upon the initialization routine, which happens automatically upon insertion of a cartridge of tape onto the magnetic tape drive according to the invention, and which takes in a presently preferred embodiment between one-quarter and one-half seconds, the microprocessor supplies a predetermined quantity of current to the motors in response to which they rotate and the tachometers associated therewith produce signals. These signals are then used by the microprocessor to calculate the torque constant, the brush and bearing friction of both motors, windage undergone by the motors, and the characteristics of the servo electronics, that is, variation in the analog characteristics of the circuit elements making up the power supplies. The microprocessor then uses these calculated figures to fill look-up tables for each motor, which may comprise solid state memories, with data corresponding to the results of these calculations, which can later be consulted by the microprocessor if it determines that a desired acceleration is required.

For example, in a presently preferred embodiment, a gain look-up table is provided which lists the desired acceleration as a function of the present velocity and radius of the individual reels.

An inertia table, which lists moment of inertia of the tape reel versus radius, that is as a function of the amount of tape on the reel, is computed during initialization and is not updated. The inertia figures can also be divided by the motor constant, $K_t$ at initialization if this is desired.

A loss table is also generated which indicates the motor losses in the brushes and bearing and windage versus velocity. These values are generated and read into the loss table at initialization and are not thereafter updated, since they represent longterm variation.

Finally, a tension table is also used. A preset number indicative of the tension desired to be on the tape, typically 8 oz., is supplied, and is divided by the radius of the reel to equal the torque required to be supplied by the motor to yield the desired tension as a function of radius.

During initialization it will be appreciated that the rate of the signals output by each of the tachometers will not vary greatly during the comparatively short initialization period due to the change in radius of the tape pack since the tape is very thin. Therefore, a "tape thickness" register is supplied with an assumed value at initialization. The tape drive of the invention is provided with an "intelligent update" to allow corrections to be made to the thickness register thereafter. The ratio of the turns made by the reels during the transit of the tape from the file reel 10 to machine reel 20 can be compared and used to update the contents of the thickness register, thus further improving accuracy.

It will thus be appreciated by those skilled in the art that a chief function of the initialization routine is to calculate the values stored in the gain look-up table, which comprises calculations based on the variation of inertia and required torque as a function of radius. Since the radius of the tape pack on each reel will of course change due to variations in tape thickness, from one reel to the next, the gain look-up table can be adjusted during operation in accordance with the thickness register to compensate for this variation.

Figure 2:
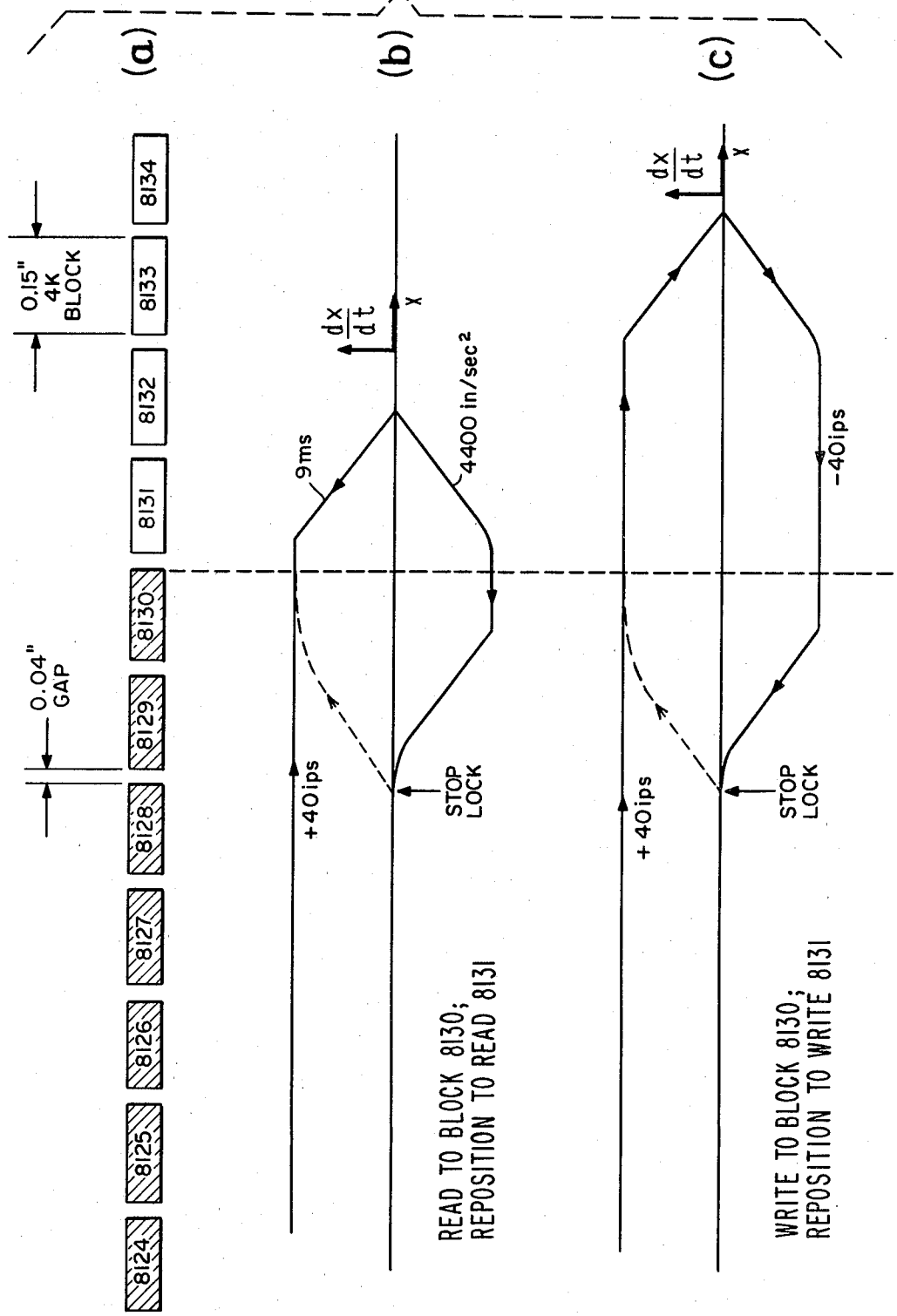
FIG. 2, consisting of a-c, is a diagram indicative of the way in which the tape speed is controlled relative to its position in read and write operations.

Reference will now be made to FIG. 2 to show a specific drive control arrangement used in the tape drive of the invention. FIG. 2a represents a way in which the data may be recorded on the tape. It is recorded, as noted, in blocks, each containing four thousand (4K) words of data and being 0.15 inches long. Gaps of 0.04 inches are left between these blocks. The block/gap arrangement of recording data has been used in the prior art according to which prior art tape drives typically require that after a given read operation had been performed, that is, when the data up to a given block, such as indicated by block 8130 in FIG. 2(a), had been read, the tape drive would then be required to stop in the gap between blocks 8130 and 8131. Similarly, when it was desired that the tape start to move again, it had to reach its full speed within the gap. Since the tape speed of typical prior art tape drives are as high as 250 inches per second (ips), severe acceleration and deceleration capabilities are required of the machinery, and gaps of 0.3–0.6 inches are required. It is for this reason that the prior art tape drives typically utilize vacuum buffers so as to decouple the mass of tape from that portion which is forced to undergo these violent accelerations and decelerations.

By comparison, acceleration and deceleration of the present tape drive is comparatively gentle. This is permitted by not requiring starting or stopping within a single gap. Provision of the solid state buffer which allows the tape additional time to come up to speed while the data buffer as a whole is still accepting data from a host computer, thus allowing substantially equal performance. Moreover, improvements in read/write head design enable the tape drive of the invention to have a competitive data rate on tape while operating at a maximum speed of 40 ips, and the interblock gaps can be made far smaller.

The operation of the tape drive is shown with respect to FIGS. 2b and c which are respectively illustrations of the read operation and the write operation. In both the horizontal axis is labeled x and indicates the relative position of a point along the tape, while the vertical axis, labeled dx/dt is of course the instantaneous velocity of the tape at that point.

Thus, for example, FIG. 2(b) illustrates what happens when the tape is proceeding along in the rightward direction at a steady speed of 40 ips. Let us assume that the host computer has directed the tape drive to "read to block 8130". When the dotted line cutting down FIG. 2 at the end of block 8130 passes the read head, therefore, the tape begins a steady deceleration at a rate of −4400 inches per second per second. In this way the tape reaches zero velocity (indicated by the intersection of the downwardly slanting line with the x axis) in a time of approximately 9 ms. The tape is then repositioned: it accelerates at an equal but opposite rate backward until it reaches −40 ips, travels a short distance, and then slows down and stops once again. It remains at the position marked "stop lock" until it is directed to read again, at which time it accelerates, as indicated by the dotted line, back up to 40 ips. This acceleration requires typically 15 ms. It will be appreciated that this acceleration is such as to position block 8131 at the read head in time to receive data. Therefore, where the prior art tape drive, when confronted with a "read to block 8130" command simply stopped in the gap between blocks 8130 and 8131, the present tape drive slows to a stop over a longer period of time, thus greatly reducing the motor power required, lightening the mechanical loading of the various components of the tape drive and thus simplifying their construction and rendering it less expensive. The drive according to the invention then backs up and stops so as to be repositioned and be ready to read block 8131. Not only does this ease mechanical requirements, but additionally the gaps can be much smaller, allowing for more efficient use of tape.

FIG. 2(c) is a similar diagram of the write operation. As above, the prior art tape drive when directed to "Write through block 8130" would write continually to the end of block 8130 and then stop in the gap between blocks 8130 and 8131. Instead, the present invention slows down at a comparatively leisurely pace and backs up so as to be then ready to write beginning with block 8131 after a short time delay required to accelerate back up to speed. Again, in distinct contrast to the prior art, the ending of a write operation involves the repositioning of the tape to be poised to write at the next block. As discussed above, a buffer may be provided in certain embodiments of the invention to accept data from the host computer during the period of time when the host has directed that the write operation be begun but before the tape has accelerated up to speed, as indicated by the dotted line of FIG. 2(c).

It will be appreciated by those skilled in the art that one possibility for improving the performance of the tape drive of the invention would be to make the velocity profile shown in FIG. 2(b) look more like that of FIG. 2(c). That is to say, to continue reading of the tape some time past the end of the last called-for block, storing the data in a buffer, and only then repositioning the tape. In this way, if the host then ordered reading of block 8131, this data would already be stored in the buffer and could be immediately output to the host while the tape was being brought up to speed.

As mentioned above, the usual mode of operation of a tape drive is for a single reel to be kept on the take-up side (the machine reel) and reels of tape to be read from, written to, or both, mounted on the supply reel (the "file" reel). In the operation of the present invention, the fact that the machine reel is not changed from time to time is used to provide indication of the absolute position of the tape with respect to the read/write head since it is essential that the initial radius of one of the two reels and the tape thickness be known, while the radius of the file reel can change. Accordingly, the machine reel becomes the "master" reel and the supply reel becomes its "slave"; that is, the tape is effectively pulled from the slave reel by the master reel. The slave reel is simply used to maintain tension on the tape.

Figure 3:
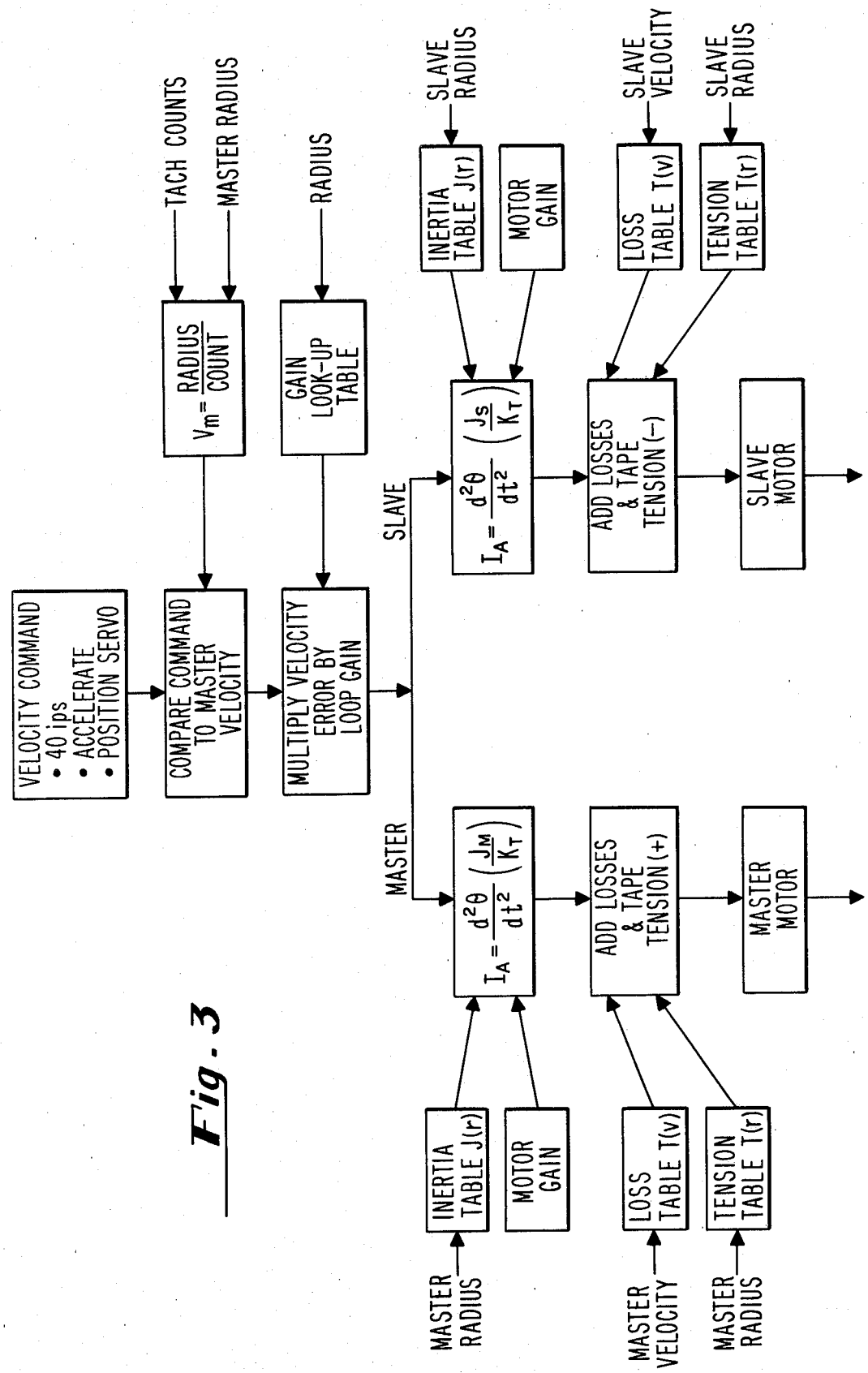
FIG. 3 is a flowchart showing how the motors are controlled during operation.

Reference will be made to FIG. 3 for a discussion of the way in which the master and slave servo motors are controlled.

A velocity command is provided by the microprocessor in response to a request from the host computer. In the preferred embodiment of the invention, the steady state speed of the tape drive is 40 inches per second. During read/write operations the tape would be held at this speed. Regardless, however, of whether the tape is maintained at a steady speed, is to accelerate or to decelerate, a velocity command is available at all times for comparison with the output of the velocity measurement circuitry. Thus, the velocity command is compared to the master velocity. The velocity error signal thus derived is multiplied by the loop gain; the gain being derived from the gain look-up table as a function of radius. The gain look-up table, as described above, lists the acceleration required as a function of present velocity and radius. This desired acceleration signal (noted on the drawing in accordance with the notation employed above) is supplied in a preferred embodiment to software controlling the microprocessor for calculating the applied current $I_a$ as a function of the inertia of the motor/reel system $J_m$ (which is a function of radius and is derived from the inertia table) divided by the motor gain $K_t$, which was determined at initialization. It will thus be appreciated that it is necessary to have an inertia table showing the moment of inertia $J_m$ of the reel motor tape system as a function of radius for both master and slave as well as of the differing motor gain constants $K_t$ for both motors. Next additional current is added to $I_a$ for both master and slave to compensate for the torque losses in the motor, which has been determined as a function of velocity during initialization and written in a look-up loss table, i.e., T(v). Additional current is also added to that supplied to the master servo motor and is subtracted from the slave servo motor current so as to generate a predetermined amount of tension in the tape. That is, the master "pulls" the tape slightly harder than the slave "pushes" it. Here the additional torque exerted T(r) is a function of radius. In the preferred embodiment, the tape tension is controlled to approximately 8 ounces for a tape having a yield strength of approximately 50 ounces. The resultant signal is then applied to the control of power amplifiers which in turn supply the actual drive current $I_a$ to the motors.

It will be appreciated that according to the method of the invention, the tension in the tape and its speed can be controlled by the microprocessor being supplied with initialization information regarding the radius of one reel, a tape thickness figure, the current required to generate a specific torque in each motor, and with instantaneously updated information regarding the relative sizes of the tape packs on the two reels, which may be supplied by tachometers providing signals proportional to motor speed. From this information, registers can be maintained indicating the radius and velocity of master and slave reel tape packs which information can then be used to access the inertia, loss and tension tables for both, in turn providing the information required to generate the appropriate motor current. Stated differently, given an initial velocity command signal and knowing the initial radius of one of the reels, and being supplied with signals indicative of the relative size of the reels, the microprocessor is capable of calculating the current to be supplied to the motor to generate the appropriate velocity as a function of the radius and velocity of the slave and master tape packs at any given time. It will be furthermore appreciated by those skilled in the art that this approach eliminates many variables which had been troublesome in prior art systems. In particular, for example, the question of tape thickness is dealt with by updating of the thickness register during operation. Since tape tension is electronically supplied by control of the motor current, it need not be directly measured, thus eliminating expensive and complex mechanical means in favor of calculation. The use of the initialization routine eliminates errors in the analog electronics and in the response of the motors over time due to aging and the like. It is true that once initialization has been performed, changes in, e.g. the response of one or other of the motors to changes in input current due to thermal drift or the like will show up as variation in the tape tension. However, in a presently preferred embodiment the motors used are such that these do not affect the tension to a degree such that direct tension measurement is required, although it is possible that in some embodiments of the system according to the invention, such tension sensing could be of utility as a backup system.

Figure 4:
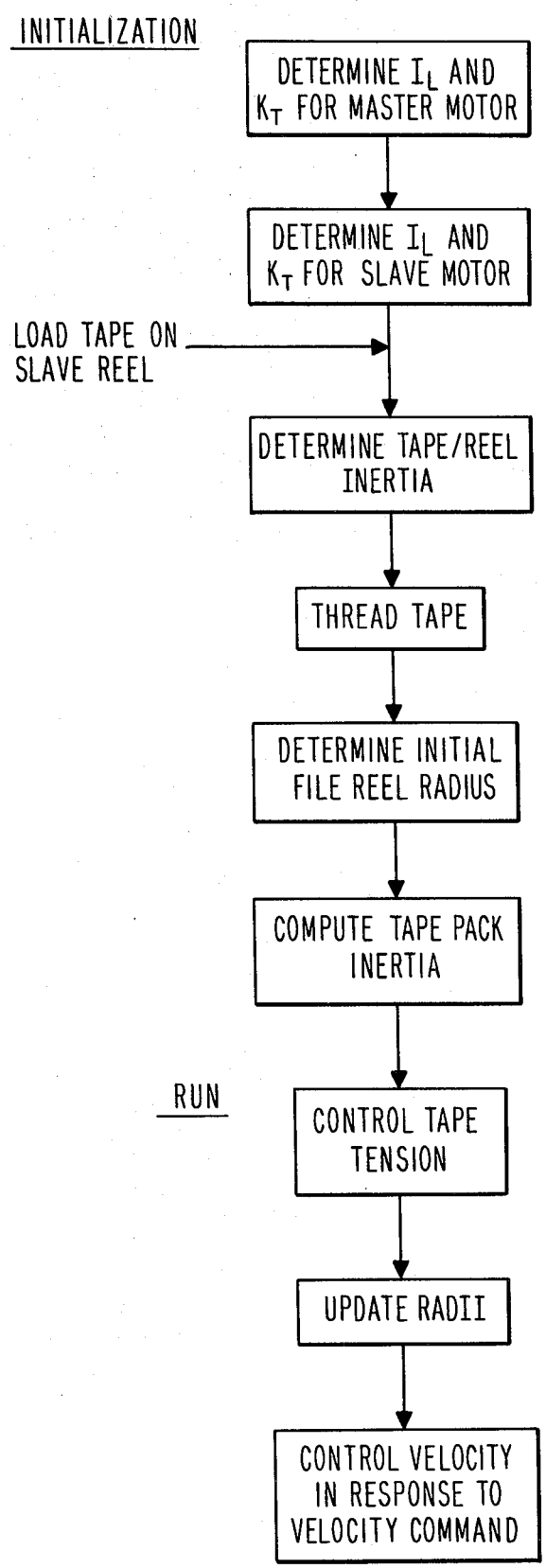
FIG. 4 is a flowchart showing the various steps in the initialization routine.

The initialization routine will now be described with respect to FIG. 4. Initialization begins, as noted in FIG. 4, by determination of $I_L$, the loss current, and $K_t$, the motor gain, for both master and slave motors. This is done prior to mounting of the tape reel on the file (slave) motor shaft; the motors are spun at a nominal speed and the required current is recorded as $I_L$. The test is then repeated in the reverse direction. Next, the motor current is changed step-wise for a specified period, and is then returned to $I_L$. Using the tachometers described above, the resulting velocity changes are measured and are used to determine the amplifier/motor gain $K_t$. In this case, it will be understood that the "load" on the motor is assumed to be known; it amounts, of course, to the motor and hub inertia taken together.

The tape reel to be used is then mounted on the slave reel and the tape and reel inertia together is determined. This may be done again by changing the motor current step-wise from $I_L$ for a short period of time. In this case, the velocity change can be used to calculate the inertia of the reel and tape system together. Next, the tape is threaded from the slave reel onto the master, using any prior art technique applicable, such as pneumatic feeding of the loose end of the tape onto a vacuum assisted master reel hub. The tape having been threaded, a fixed number of turns of tape are wound up onto the machine reel. The number of turns undergone by the file reel can then be used to determine the relative radii of the two reels; and since the radius of the machine reel is fixed, the actual radius of the file reel can then be calculated. The file reel radius is then used to compute a theoretical tape pack inertia for the file reel taken together with the tape to be operated upon. The difference between this inertia and the inertia determined above prior to threading of the tape path is therefore that of the empty file reel. This quantity, of course, will remain fixed throughout operations, while that of the tape pack, i.e., the inertia of the reel and of the tape, will vary as the tape is wound onto the machine reel. The load inertia and the motor amplifier gain determined above then become factors in correcting the nominal loop gain to be applied to the motors in accordance with the velocity command. As noted above, in connection with FIG. 3, these are functions of radius and are determined by values stored in the various look-up tables discussed above. Similarly, the tape tension-controlling current, to be added or subtracted to master and slave motor currents, respectively, is likewise found in the look-up tables as a function of radius.

The tape pack inertia having been calculated as described above, the system is ready for operation. In accordance with the velocity command, the system supplies current to the master and slave motors so as to control the tape tension at a fixed value. During operation, several registers are updated, also as indicated above. The tape thickness register, for example, is updated using the initial radii of the reels and, of comparison of the numbers of turns undergone by the file and machine reels. The thickness register information in turn can be used to update the file and machine tape pack radii values, all as described above.

In addition to the specific control features mentioned above, there are several other possibilities which may be useful with some embodiments of the system according to the invention. For example, during a write operation the interblock gap can be used for velocity verification; that is, the time taken to write a gap at a specific velocity is known, so that if the time taken for the gap to pass one of the heads during a read operation is the same, it is clear that the velocity has remained constant. Such an expedient is described in some of the prior art patents referred to above. Another possibility would be to increase the tape tension from the nominal value given in order to flatten out any creases in the tape, which can lead to errors in either read or write operations or both, while another possibility is to vary the speed of the tape during read operations in the event that numerous errors are detected. As is well known, frequently by slowing the speed of the tape past the read head data read in error at design speed can be read correctly.

It will be appreciated by those skilled in the art that there has been described an adaptive servo tape drive system which eliminates the disadvantages of the prior art systems discussed above. Specifically, no direct measurement of torque is necessary, nor are vacuum buffers or the like. In embodiments where it is essential that the tape drive unit respond instaneously to a host computer, a solid state buffer may be supplied to contain a quantity of data equal to the transmission rate of the channel to which the tape drive is connected times the time necessary for the tape drive to get up to speed. The fact that the tape drive need not start and stop within an interblock gap allows the mechanical drive components of the system to be greatly simplified over the prior art, thus rendering them at once more reliable and less expensive, while the space taken up by the system of the invention is greatly smaller than those of the prior art since no vacuum columns or the like are required. Furthermore, the use of the initialization routine at the beginning of processing of any given reel of tape provides automatic compensation for variation in mechanical system tolerances as well as electronic component tolerances both as supplied and as varied over time; thus, the use of the initialization routine, by eliminating mechanical errors, allows anticipation of the required torque to be supplied by a motor to a degree such that direct feedback of the tension on the tape (where all velocity errors show up) is not necessary. Still further, use of the machine reel radius as a fixed reference in conjunction with instantaneous data provided by tachometers reading the instantaneous velocity of both motors allows calculation of the absolute position of the tape with respect to the read/write head.

It will be appreciated by those skilled in the art that there are additional refinements which can be added to the system of the invention, given its use of the initialization routine, to determine the actual values of what would otherwise be variables in the motion control equation. For example, during the initialization routine a fixed current is suppled to the motors in order to determine the torque output by them in response thereto. It will appreciated that by supplying a gradually increasing current to the motors during initialization, the point at which the motor rotates at its design speed is indicative of motor losses and can be used therefore in supplying this information to the loss table for use later in calculation of the current to be supplied to the motors to generate the proper tape tension.

The tape tension being controlled by the microprocessor at all times may also advantageously be varied during certain modes of operation of the machine. For example, it may as noted above be useful to increase the tension to flatten any creases in the tape. Also, during rewind it may be desirable that the tape run at a lower tension. This can be easily and simply done according to the present invention by simply having the currents supplied to the two motors during rewind be closer to one another (allowing for losses and windage and the like) so as to lower the tension on the tape. Therefore, it will be appreciated that there are numerous other modifications and improvements which can be made to the system of the invention without departing from its spirit and scope which is as defined by the following claims.

What is claimed is:

1. Method of recording digital data on magnetic tape supplied from a first reel, guided past a magnetic read/write head and wound upon a second reel, said data being received from a host computer in a predetermined format according to which said data is recorded in blocks of predetermined size having gaps of predetermined size interposed therebetween, comprising the steps of:

causing said tape to be passed from said first reel past said head onto said second reel at a substantially constant velocity during said reading or recording; and, in response to a signal that said reading or recording is to be stopped at a given point on said tape after recording of one of said blocks of data on said tape, performing a routine comprising the steps of:

decelerating said tape to a halt; and rewinding a quantity of said tape onto said first reel from said second reel; and halting said tape;

the length of said quantity of tape being such that in response to a signal from said host that said recording is to be resumed, said tape may be accelerated to said substantially constant velocity at a rate of acceleration such that said velocity is reached before said given point is juxtaposed to said read/write head, wherein the length of said quantity of tape rewound onto said first reel is substantially greater than the length of one of said gaps.

2. The method of claim 1 further comprising the step of storing data transmitted by said host to said drive for storage in data buffer means during said acceleration, whereby said host may transmit data to said tape drive for storage while said tape drive is accelerating.

3. Magnetic tape drive apparatus for storage of data, comprising:

first and second file reel motors;

first and second spindles on said motors being adapted for mounting thereon of reels of magnetic tape;

a read/write head;

solid-state memory means; and controller means;

wherein data is recorded on tape passing by said head, wherein upon indication by a host computer that data recording is to end at a given first point, said tape drive decelerates to a stop, accelerates in the opposite direction until a predetermined velocity is released, continues to run backward at said predetermined velocity for a predetermined length of time and decelerates again to a halt, said predetermined length of time being chosen so that upon said host commanding said drive to resume recording data on said tape at a second point following said first point, said tape drive accelerates to its running velocity, data output by said host being stored in said memory means during said acceleration and thereafter copied to said tape beginning at said second point, whereby said host can output data to said tape drive immediately after indicating that recording is to be resumed.

* * * * *